3,274,290
RIGID, SEGMENTED COPOLYESTERS HAVING RECURRING AROMATIC SULFONATE ESTER UNITS
Eugene P. Goldberg, Highland Park, and Frank Scardiglia, Arlington Heights, Ill., assignors to Borg-Warner Corporation, Chicago, Ill., a corporation of Illinois
No Drawing. Filed Oct. 25, 1963, Ser. No. 318,841
10 Claims. (Cl. 260—860)

This invention relates to linear block copolymers comprised of three different recurring ester structural units, i.e., (1) aromatic carboxylate ester units, (2) aromatic sulfonate ester units, and (3) aliphatic polyester units. More particularly, this invention relates to high molecular weight polyester block copolymers that may be tailored to exhibit a combination of extremely desirable physical and chemical properties.

There is a constantly growing market for synthetic polymers that exhibit high heat distortion temperatures, high strength characteristics, and good chemical stability for use as films, fibers, molded parts, and the like. The new copolymer compositions of the present invention may be economically prepared from readily available monomers and exhibit a highly desirable combination of physical and chemical properties. The polymers of the present invention can also be selectively formulated to exhibit a wide range of softening temperatures and viscosities. The polymers additionally possess unique properties such as high melting points and good strength characteristics.

Linear segmented copolyesters have been known heretofore. For example, Flory, U.S. Patent 2,691,006, teaches the preparation of segmented polyesters from two different preformed polyesters. Also, Frazer, U.S. Patent 3,037,960 teaches the preparation of elastomeric compositions from the combining of polyesters.

Some of the more versatile block copolyesters include the block copolymers comprised of aromatic ester units and aliphatic polyester block units disclosed and claimed in patent application S.N. 264,068, filed March 11, 1963 by Goldberg et al.

Generally, the present invention is directed to tough, rigid, high temperature, segmented, substantially linear copolyesters consisting of three different ester structural units, one of which is an aliphatic polyester block. These copolymers possess unique properties which adapt them for use as films, fibers, molded parts, etc. The ester stuctures are comprised of (1) recurring aromatic carboxylate ester units derived from at least one diphenol reacted with at least one aromatic dicarboxylic acid chloride, (2) recurring aromatic sulfonate ester units derived from at least one diphenol and at least one aromatic disulfonyl chloride and (3) recurring aliphatic polyester block units of about 500 to about 20,000 molecular weight derived from at least one aliphatic dicarboxylic acid or derivative thereof, reacted with at least one glycol or derivative thereof. The aliphatic polyester segments utilized are generally incorporated by using a preformed polyester having reactive functional group termination preferably acid chloride end groups. The preferred molecular weight of the aliphatic polyester segments is between about 500 and about 20,000.

More specifically, the linear copolyesters of the present invention are comprised of recurring (1) aromatic carboxylate ester structural units of the formula,

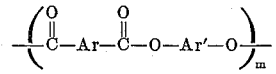

(2) aromatic sulfonate ester structural units of the formula,

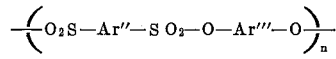

and (3) aliphatic polyester structural units of the formula,

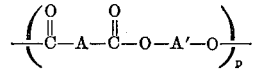

wherein A and A′ are bivalent aliphatic radicals which may contain one or more double bonds and one or more bivalent radicals of atoms other than carbons such as —O—, —S—, etc. Ar, Ar′, Ar″, and Ar‴ are bivalent aromatic radicals; $m$ and $n$ are positive integers greater than one, and $p$ is a positive integer equal to or greater than 5. The units may be joined into long molecular chains in a wide variety of fashions. It will be noted that in each case of joining molecular chains, sub $m$ and $n$ of Formulas I and II will be at least one and sub $p$ of Formula III will generally have an average value equal to or greater than 5.

The aromatic dicarboxylic acid chloride that are mixed with the aromatic disulfonyl chlorides and acid chloride terminated aliphatic polyester will have the general formula:

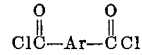

wherein Ar is a bivalent aromatic hydrocarbon radical.

Examples of the aromatic dicarboxylic acid chlorides are as follows: phthalyl chloride; isophthalyl chloride; terephthalyl chloride, 4,4′-biphenyldicarboxylic acid chloride; 4,4′-diphenylmethanedicarboxylic acid chloride; 2,2-bis-(4-carboxychlorophenyl)-propane, etc.

The aromatic disulfonyl chlorides that are mixed with the aromatic dicarboxylic acid chlorides and acid chloride terminated aliphatic polyesters have the general formula,

wherein Ar is a bivalent aromatic hydrocarbon radical.

Examples of aromatic disulfonyl chlorides that are useful in the practice of this invention are as follows: the benzene disulfonyl chlorides, i.e., o, m, p isomers, the biphenyl disulfonyl chlorides, arylsulfonedisulfonyl chlorides, and the aryletherdisulfonyl chlorides.

The acid chloride terminated aliphatic polyester that is mixed with at least one aromatic dicarboxylic acid chloride and at least one aromatic disulfonyl chloride, as above mentioned, may be provided by reacting at least one aliphatic dicarboxylic acid chloride with at least one glycol. The aliphatic dicarboxylic acid chloride is generally represented by the formula,

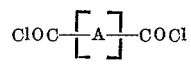

wherein A is a hydrocarbon radical. Examples of dicarboxylic acid chlorides that are useful in the practice of this invention include aliphatic and cycloaliphatic dicarboxylic acid chlorides of which the following are representative: malonyl chloride; oxalyl chloride, succinyl chloride; glutaryl chloride; adipyl chloride, pimelyl chloride; suberyl chloride, azelayl chloride; sebacyl chloride; cis- and trans- 1,4-cyclohexanedicarboxylic acid chloride; cis- and trans-1,3-cyclohexanedicarboxylic acid chloride; cis- and trans-1,3-cyclobutanedicarboxylic acid chloride; etc.

The glycols that may be reacted with the aliphatic dicarboxylic acid chlorides, to provide the acid chloride terminated aliphatic polyester, are generally represented by the formula, $$HO-R-OH$$

wherein R is a bivalent aliphatic or alicyclic hydrocarbon radical. Included among the aliphatic glycols which may be reacted with aliphatic dicarboxylic acid chlorides to form the acid chloride terminated polyester are ethylene, propylene, isobutylene, tetramethylene, pentamethylene, 2,2-dimethyltrimethylene, hexamethylene, and decamethylene glycols and 1,4-di-(hydroxymethyl)-cyclohexane.

Alternatively, the acid chloride terminated polyester blocks may be prepared by the following techniques: (1) treatment of a carboxyl terminated polyester (which can be prepared by reacting a glycol with an excess of dicarboxylic acid in the presence of an esterification catalyst) with a chlorinating agent, such an thionyl chloride, $PCl_3$, $PCl_5$, etc.; and (2) treatment of a low molecular weight hydroxyl terminated polyester with an excess of dicarboxylic acid chloride.

Essentially, any dihydric phenol may be reacted with the mixture of at least one aromatic dicarboxylic acid chloride, at least one aromatic disulfonyl chloride, and acid chloride terminated aliphatic polyester. The diphenol is generally represented by the formula,

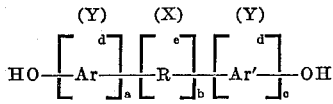

wherein R is an alkylene, alkylidene, or cycloaliphatic linkage, e.g., methylene, ethylene, propylene, isopropylene, isopropylidene, butylene, isobutylene, amylene, cyclohexylene, cyclopentylidene, etc.; a linkage selected from the group consisting of ether; carbonyl; amino; a sulfur containing linkage, e.g., sulfide, sulfoxide, sulfone; a silicon containing linkage, e.g., silane, or siloxy; a phosphorus containing linkage, etc. R can also consist of two or more alkylene or alkylidene linkages connected by such groups as aromatic, amino, ether, carbonyl, silane, siloxy, sulfide, sulfoxide, sulfone, a phosphorus containing linkage, etc. Other groups which are represented by R will occur to those skilled in the art.

Ar and Ar' are mono- or polycarbocylic aromatic groups such as phenylene, biphenylene, terphenylene, naphthylene, etc. Ar and Ar' may be the same or different.

Y is a substituent selected from the group consisting of organic, inorganic, or organometallic radicals. The substituents represented by Y include (1) halogen, e.g., chlorine, bromine, fluorine, or (2) ether groups of the general formula OE where E is a monovalent hydrocarbon radical similar to X or (3) monovalent hydrocarbon groups of the type represented by R or (4) other substituents, e.g., nitro, cyano, etc., said substituents being essentially inert to the polymerization reaction environment.

X is a monovalent hydrocarbon group exemplified by the following: alkyl, such as methyl, ethyl, propyl, isopropyl, butyl, decyl, etc.; aryl groups, such as phenyl, naphthyl, biphenyl, xylyl, tolyl, etc.; aralkyl groups, such as benzyl, ethylphenyl, etc.; cycloaliphatic groups, such as cyclophentyl, cyclohexyl, etc.; as well as monovalent hydrocarbon groups containing inert substituents therein. It will be understood that where more than one X is used, they may be alike or different.

$d$ is a whole number ranging from 0 to a maximum equivalent to the number of replaceable hydrogens substituted on the aromatic rings comprising Ar or Ar'. $e$ is a whole number ranging from 0 to a maximum controlled by the number of replaceable hydrogens on R. $a$, $b$, and $c$ are whole numbers including 0. When $b$ is not 0, neither $a$ nor $c$ may be 0. Otherwise either $a$ or $c$, but not both, may be 0. Where $b$ is 0 in the above formula, the aromatic groups are joined by a direct bond between the carbocyclic ring carbon atoms with no connecting alkyl or other linkages.

The hydroxyl and Y substituents on the aromatic groups, Ar and Ar' can be varied in the ortho, meta or para positions on the aromatic rings; and the groups can be in any possible geometric relationship with respect to one another.

The above formula for the diphenols may also be more generally and conveniently depicted by the formula below wherein the aromatic carbocyclic group D shown in the formula above represents all of the molecule except the hydroxyl functions:

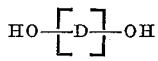

Examples of difunctional phenols that are useful in the practice of this invention include bisphenols of which the following are representative:

2,2-bis-(4-hydroxyphenyl)-propane (Bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydroxyphenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane.

The preparation of these and other applicable bisphenols is known in the art. They are most commonly prepared by condensation of two moles of a phenol with a single mole of a ketone or aldehyde.

Also useful are dihydroxybenzenes typified by hydroquinone and resorcinol; dihydroxybiphenyls, such as 4,4'-dihydroxybiphenyl, 2,2'-dihydroxybiphenyl, 2,4'-dihydroxybiphenyl; and dihydroxynaphthalenes, such as 2,6-dihydroxynaphthalene, etc.

Dihydroxyaryl sulfones are also useful, such as bis-(4-hydroxyphenyl)-sulfone; 2,4'-dihydroxyphenyl sulfone; 2,4'-dihydroxy-5'-chlorophenyl sulfone; 3,chloro-4,4'-dihydroxyphenyl sulfone; bis-(4-hydroxyphenyl)-biphenyl disulfone; etc. The preparation of these and other useful dihydroxyarylsulfones is described in United States Patent No. 2,288,282 issued to Huissmann. Polysulfones as well as sulfones substituted with halogen, nitro, alkyl, and other substituents are also useful. In addition, related sulfides and sulfoxides are applicable.

Dihydroxyaromatic ethers are useful and may be prepared by methods found in United States Patent No. 2,739,171 issued to Linn and in "Chemical Reviews," 38, 414–417 (1946). Typical of such dihydroxyaryl ethers are the following: 4,4'-dihydroxyphenyl ether; 4,4'-dihydroxy-2,6-dimethylphenyl ether; 4,4'-dihydroxy-3,3'-diisobutylphenyl ether; 4,4'-dihydroxy-3,3'-diisopropylphenyl ether; 4,4'-dihydroxy-3,3'-dinitrophenyl ether; 4,4'-dihydroxy-3,3'-dichlorophenyl ether; 4,4'-dihydroxynaphthyl ether; etc. The many other types of suitable dihydroxyaryl compounds will be apparent to those skilled in the art.

Block copolymers having tailored structures are preferably provided in accordance with this invention in the following manner. At least one aliphatic dicarboxylic acid chloride or derivative thereof is reacted with at least one glycol to provide an acid chloride terminated aliphatic polyester. The polyester ingredients may be reacted by direct esterification. For purposes of this invention, the acid chloride terminated aliphatic polyester block may be prepared by any of the conventional methods well known in the art. These polyesters, as mentioned will have a molecular weight of between about 500 and about 20,000. In a preferred method of polymerization, the acid chloride terminated polyester is mixed with at least one aromatic dicarboxylic acid chloride and at least one aromatic disulfonyl chloride in an inert organic solvent, and this mixture is added to an aqueous solution of the alkali metal salt of at least one diphenol. A polycondensation reaction is then conducted interfacially. If desired, the order of addition of the reactants may be reversed, i.e., the aqueous solution of the alkali metal salt of at least one diphenol may be added to the mixture of acid chloride terminated polyester of at least one aromatic dicarboxylic acid chloride and at least one aromatic disulfonyl chloride.

As the molecular weight of the acid chloride terminated aliphatic polyester block is generally higher than the molecular weight of either the aromatic dicarboxylic acid chloride or the aromatic disulfonyl chloride, the aliphatic polyester will provide fewer reactive acid chloride end groups for further reaction with a diphenol than are provided by the aromatic dicarboxylic acid chloride and aromatic disulfonyl chloride. The structure of the polymeric chain will be determined statistically and will depend upon the variations in the molecular weights of the aromatic acid chlorides and the aliphatic polyester, as well as by varying the proportions and other addition of ingredients reacted.

The physical and chemical properties of a copolymer resulting from the combination of ester units, as described, depends on the average molecular weight and the mole percent of the aliphatic polyester block. Because of the relatively high molecular weight of the aliphatic polyester block component, a high weight percent can be incorporated into the polymer system at a relatively low mole fraction.

As mentioned, the aliphatic polyester units of the block copolymers can be readily prepared by conventional techniques, such as, for example, reaction of a polymeric glycol with a slight excess of an aliphatic dicarboxylic acid chloride. The polycondensation of the diphenols with the acid chloride terminated aliphatic polyesters that have been previously mixed with at least one aromatic dicarboxylic acid chloride and at least one aromatic disulfonyl chloride is preferably conducted via an interfacial polycondensation technique. The interfacial polymerization may be carried out at or near room temperature by mixing a basic aqueous solution of alkali metal salt of at least one diphenol with the mixture of acid chloride terminated aliphatic polyester and aromatic dicarboxylic acid chloride and aromatic disulfonyl chloride contained in an inert organic solvent. The addition of a basic organic catalyst, such as a quaternary ammonium salt or a suitable amine, is useful in promoting higher molecular weights. The reaction mixtures are preferably stirred vigorously for varying periods of time; and the copolymers precipitated or coagulated by any suitable means, as for example, by addition to a nonsolvent, such as isopropyl alcohol. The precipitated copolymers are generally washed to remove any residual impurities and dried.

The organic solvent utilized for the mixture of the acid chloride terminated aliphatic polyester and aromatic acid chlorides may be any inert organic solvent which preferably also has some solvent power with respect to the polymer formed. Typical of such solvents are methylene chloride, tetrachloroethylene, tetrachloroethane, chloroform, carbon tetrachloride, o-dichlorobenzene, etc. The concentration of reactants in the aqueous and organic phases may vary over a relatively wide range, from less than one weight percent to more than 20 weight percent, being limited at the high concentration only by the increasing difficulties encountered in handling the extremely viscous media formed. Polymerization time may be varied from less than five minutes to more than three hours, depending upon the reactivity of the copolymer reactants and the molecular weight desired. Extremely short polymerization periods will generally result in lower molecular weight copolymers, as compared with longer polymerization periods which provide higher molecular weight. Although it may be preferred in certain cases to use approximately equimolar quantities of diphenols with the acid chloride terminated aliphatic polyesters and aromatic acid chlorides or mixtures thereof, the reactivity of the acid chloride terminated mixture and the reaction conditions are such that the use of exact stoichiometry is not critical to the attainment of relatively high molecular weight block copolymers. The mode of addition of the acid chloride mixture, i.e., the acid chloride terminated aliphatic polyester and aromatic acid chlorides to the diphenols is therefore governed by the nature of the copolymer desired; and it is possible to add incrementally or to batch mix the reactants if desired. In addition, it is also possible to invert the order of addition of reactants and add the diphenols to the acid chloride terminated mixture.

The basic organic catalyst may be added initially or during the course of the polycondensation, or alternatively it may be added incrementally during the reaction. Although benzyltrimethylammonium chloride is a particularly effective catalyst, other quaternary salts and suitable amines are effective. The amount of catalyst added may vary from less than one hundredth weight percent to more than one weight percent. Though the polymerization temperature may be varied over a wide range, as for example, from less than 0° C. to more than 100° C., it is most convenient to conduct the reaction at or about room temperature, i.e., 25° C.

The examples following are illustrative of the preparation of aliphatic polyester-aromatic polyester copolymers from aliphatic polyester acid chlorides mixed with aromatic ester chlorides and reacted with diphenols.

EXAMPLE

*Preparation of poly (neopentyl adipate)*

A solution of 54.4 g. (0.522 mole) of neopentyl glycol in 200 ml. of o-dichlorobenzene was introduced into a 500 ml. resin kettle furnished with stirrer, thermometer, condenser and gas inlet tube. The solution was heated to 80° C. and adipyl chloride (98.5 g., 0.538 mole) was added dropwise over a four-hour period at 80–90° C. An inert atmosphere was maintained in the reaction vessel by bubbling through the solution a slow stream of argon. The reaction mixture was kept at 80–90° C. for three additional hours and at 60–65° C. overnight. The o-dichlorobenzene and the excess adipyl chloride were then removed by vacuum distillation. The reaction mixture was then heated in vacuo at 100–110° C. for 2.5 hours.

The product was a very viscous yellow liquid which had an intrinsic viscosity of 0.28 dl/g. measured in o-dichlorobenzene and a molecular weight, measured by means of infrared spectroscopy, of 7,700. The concentration of hydroxyl and carboxyl end groups was below the limit of detection using an infrared spectrophotometer.

By varying the dicarboxylic acid chloride:glycol ratio and the reaction conditions, acid chloride-terminated polyester blocks in the molecular weight range of 500 to 20,000 can be readily obtained.

The following example illustrates the method of preparation of block copolymer derived from diphenols, aromatic dicarboxylic acid chlorides; aromatic disulfonyl chlorides and acid chloride-terminated polyester blocks.

*Example I.—Preparation of block copolymer derived from bisphenol-A, isophthalyl chloride, terephthalyl chloride, 4,4'-biphenyldisulfonyl chloride, and poly(hexanediol succinate) (BJ 177)*

A solution of 1.847 g. (9.1 mmoles) of isophthalyl chloride, 1.847 g. (9.1 mmoles) of terephthalyl chloride, 2.129 g. (6.07 mmoles) of 4,4'biphenyldisulfonyl chloride and 1.395 g. of acid chloride-terminated poly(hexanediol succinate) having an intrinsic viscosity of 0.26 dl/g. in 78 ml. of methylene chloride was added over a 1 minute period to a solution of 5.580 g. (24.41 mmoles) of Bisphenol-A, 54 mmole of NaOH and 8 drops of a 60% aqueous solution of benzyltrimethylammonium chloride in 150 ml. of water. The reaction mixture was agitated vigorously at room temperature for 30 minutes. The aqueous phase was discarded and the block copolymer was isolated by addition of the methylene chloride layer to methanol. The block copolymer was washed several times with distilled water and methanol and dried overnight in a vacuum oven. The intrinsic viscosity of the block copolymer, measured in 1,1,2,2-tetrachloroethane, was 0.80 dl/g.

A number of block copolymers were prepared using essentially the same procedure as in Example I. Some of the results obtained are summarized below.

TABLE I

| Example | II | III | IV | V | VI |
|---|---|---|---|---|---|
| Isophthalyl Chloride, g | 1.847 | 1.847 | 1.830 | 2.77 | 1.848 |
| Terephthalyl Chloride, g | 1.847 | 1.847 | 1.830 | 2.77 | 1.848 |
| 4,4'-Biphenyldisulfonyl Chloride, g | 2.129 | 2.129 | 2.110 | *3.19 | *6.37 |
| Poly(neopentyl adipate), g | | | 3.47 | 2.092 | 2.092 |
| Poly(hexanediol succinate), g | 1.395 | | | | |
| Poly(neopentyl azelate), g | | 1.395 | | | |
| Weight Percent of Block in Polymer | 12.5 | 12.5 | 31.1 | 12.5 | 11.6 |
| Mole Percent of Block | 0.8 | 0.8 | 2.6 | 1.0 | 1.0 |
| Molecular Weight of Block | 7,000 | 7,000 | 5,500 | 5,500 | 5,500 |
| Bisphenol-A | 5.580 | 5.580 | 5.580 | 8.37 | 8.37 |
| Intrinsic Viscosity | 0.80 | 1.0 | 1.0 | 1.0 | 0.9 |
| Yield Strength, p.s.i.: | | | | | |
| 25° C | 8,700 | 6,600 | 6,900 | 8,400 | 8,000 |
| 160° C | 1,900 | 2,100 | 1,800 | 3,100 | 2,500 |
| Ultimate Tensile Strength, p.s.i.: | | | | | |
| 25° C | 8,000 | 6,700 | 6,900 | 8,700 | 7,500 |
| 160° C | 1,900 | 2,000 | 1,600 | 3,000 | 2,500 |
| Percent Elongation at Break: | | | | | |
| 25° C | 76 | 49 | 32 | 70 | 47 |
| 160° C | 158 | 116 | 87 | 159 | 156 |
| Heat Distortion Temperature, ° C., 264 p.s.i. Load (microtest) | 157 | 183 | 162 | 180 | 173 |
| Impact Strength, kg.-cm./cm.² | 44 | 74 | 23 | 63 | 59 |

* A solution of this diacid chloride was added first to the diphenol solution, followed immediately by a solution of all the other diacid chlorides and polyester block. The total addition time was 1-2 minutes.

From the foregoing description and examples it will be apparent that the polyester copolymer compositions of this invention have excellent tensile properties (even at temperatures in excess of 150° C.), high heat distortion temperatures, exceptional impact strength, and good chemical stability. Further, these polyester copolymers are inherently versatile and useful thermoplastic polyesters that can be readily injection or compression molded or cast into films from a variety of common solvents.

It is obvious that the physical and chemical properties of these copolymers can be varied over a wide range, either by physical means, such as orientation, or by varying the nature and percentage by weight of the ingredients. Also, many other modifications and variations of the invention as hereinbefore set forth may be made without departing from the spirit and scope thereof; and therefore, only such limitations should be imposed as are indicated in the appendant claims. For example, it will be appreciated by those skilled in the art that varying the nature and the ratio of the reactants will vary the physical and chemical properties of the resultant products.

What is claimed is:

1. A rigid tough linear segmented block copolymer consisting essentially of
   (1) recurring aromatic carboxylate ester structural units of the formula

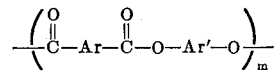

(2) recurring aromatic sulfonate ester structural units of the formula $-(O_2S-Ar''-SO_2-O-Ar'''-O)_n-$ and (3) recurring aliphatic polyester structural units of the formula

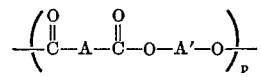

wherein Ar, Ar', Ar'', and Ar''' are bivalent aromatic radicals, A and A' are bivalent aliphatic radicals, $m$ and $n$ are positive integers equal to at least one, and $p$ is a positive integer equal to at least 5, said aliphatic polyester units of said copolymer having a molecular weight of between about 500 and about 20,000.

2. A rigid tough linear segmented block copolymer consisting essentially of
   recurring aromatic ester units obtained from the esterification of at least one aromatic dicarboxylic acid chloride with at least one diphenol,
   recurring ester units obtained from the esterification of at least one aromatic disulfonyl chloride with at least one diphenol, and
   recurring aliphatic polyester units obtained from the esterification of at least one aliphatic dicarboxylic acid chloride with at least one glycol,
   said aliphatic polyester units characterized by having a molecular weight of between about 500 and about 20,000.

3. The linear segmented block copolymer of claim 2 wherein the aliphatic polyester units are obtained from the esterification of adipyl chloride with neopentyl glycol.

4. The linear segmented block copolymer of claim 2 wherein the aliphatic polyester units are obtained from the esterification of succinyl chloride with hexanediol.

5. The linear segmented block copolymer of claim 2 wherein the aliphatic polyester units are obtained from the esterification of azelayl chloride with neopentyl glycol.

6. The linear segmented block copolymer of claim 2 wherein the aromatic carboxylate ester units are obtained from the esterification of isophthalyl chloride with 2,2-bis-(4-hydroxyphenyl)-propane.

7. The linear segmented block copolymer of claim 2 wherein the aromatic carboxylate ester units are obtained from the esterification of terephthalyl chloride with 2,2-bis-(4-hydroxyphenyl)-propane.

8. The linear segmented block copolymer of claim 2 wherein the aromatic carboxylate ester units are obtained from the esterification of isophthalyl and terephthalyl chlorides with 2,2-bis-(4-hydroxyphenyl)-propane.

9. The linear segmented block copolymer of claim 2 wherein the aromatic sulfonate ester units are obtained from the esterification of 4,4'-biphenyldisulfonyl chloride and 2,2-bis-(4-hydroxyphenyl)-propane.

10. The process of preparing a tough rigid segmented block copolymer consisting essentially of recurring aromatic polyester segments and recurring aliphatic polyester segments which comprise the steps of:
  esterifying a mixture of ester forming derivatives of at least one aliphatic dicarboxylic acid chloride and at least one glycol to provide an acid chloride terminated polyester having a molecular weight of between about 500 and about 20,000,
  mixing said aliphatic polyester with at least one aromatic dicarboxylic acid chloride and at least one aromatic disulfonyl chloride, and
  interfacially reacting said mixture with an aqueous solution of at least one alkali metal salt with at least one diphenol to thereby provide a segmented block copolymer.

References Cited by the Examiner

UNITED STATES PATENTS 3,037,960  6/1962  Frazer _____ 260—860

FOREIGN PATENTS 588,783  9/1962  Belgium.

OTHER REFERENCES

Lyman et al.: Interfacial Polycondensation XI Ordered Copolymers, Journal of Polymer Science, vol. 40 (1959), QD 281 P6j6 (pages 407–418).

MURRAY TILLMAN, *Primary Examiner.*

J. T. GOOLKASIAN, *Assistant Examiner.*